United States Patent [19]

Dunn

[11] 4,195,593
[45] Apr. 1, 1980

[54] PORTABLE DOG HOUSE

[76] Inventor: Troy Dunn, 3445 Ocean View, San Diego, Calif. 92113

[21] Appl. No.: 890,651

[22] Filed: Mar. 20, 1978

[51] Int. Cl.² .......................... E04D 1/36; A01K 1/02
[52] U.S. Cl. .................................................. 119/19; 52/70
[58] Field of Search ........................ 119/19; 52/70, 71; 135/4 R

[56] References Cited

U.S. PATENT DOCUMENTS

| | | | |
|---|---|---|---|
| 1,107,871 | 8/1914 | Alkire et al. | 119/19 |
| 1,558,545 | 10/1925 | Hoyle | 119/19 |
| 3,807,104 | 4/1974 | Webster | 52/71 |
| 4,109,427 | 8/1978 | O'Brian et al. | 119/19 |

FOREIGN PATENT DOCUMENTS 27503  6/1914 United Kingdom ..................... 119/19

Primary Examiner—Hugh R. Chamblee

[57] ABSTRACT

The invention is a portable pet-house which in the preferred embodiment defines an A-frame, the roof panels of which are pivoted at the top such that they are collapsible into a generally planar, carrying mode, there preferably being floor and end wall members carried internally between the roof panels when the unit is in its portable mode.

1 Claim, 7 Drawing Figures

U.S. Patent   Apr. 1, 1980   Sheet 1 of 2   4,195,593
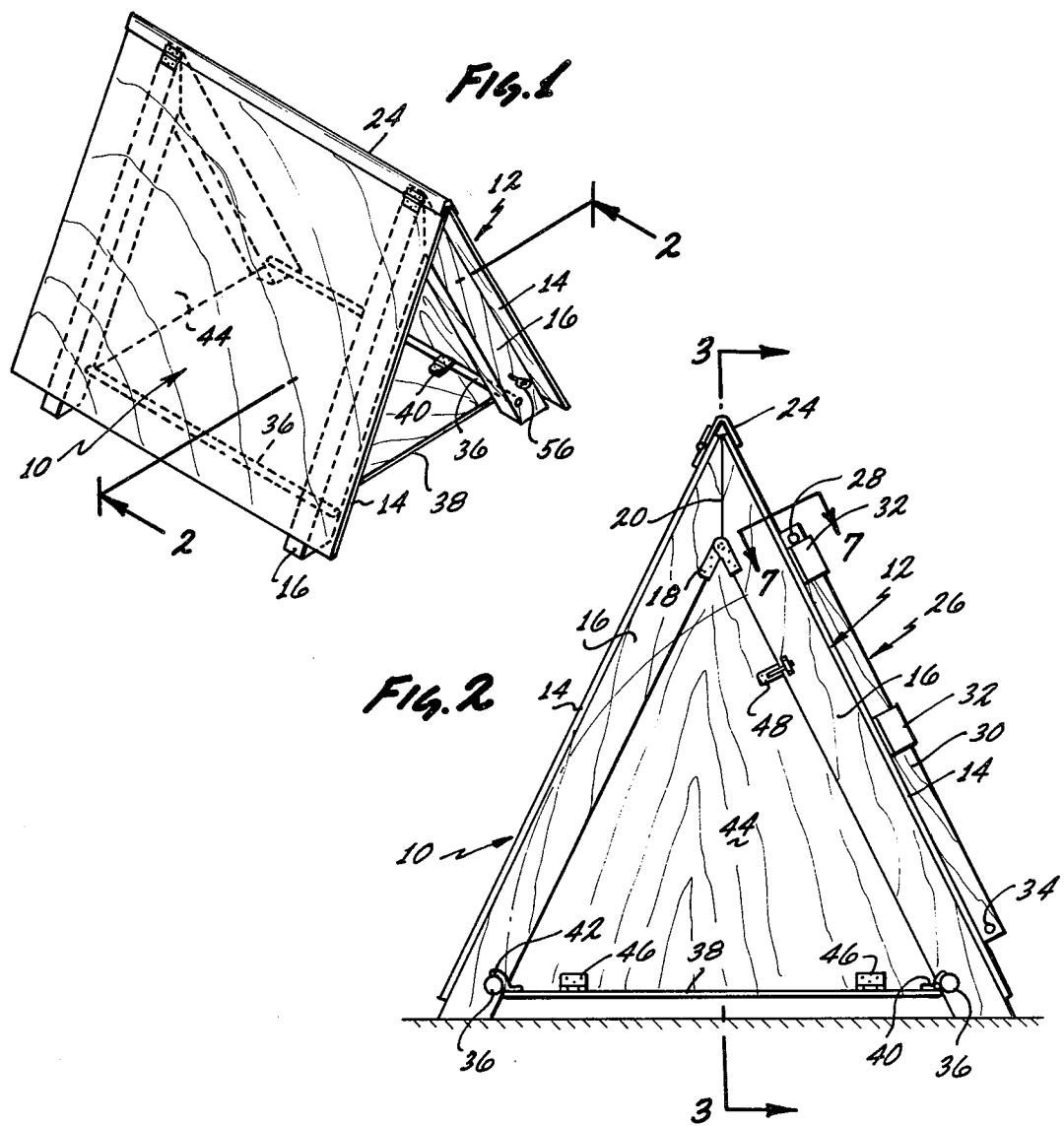
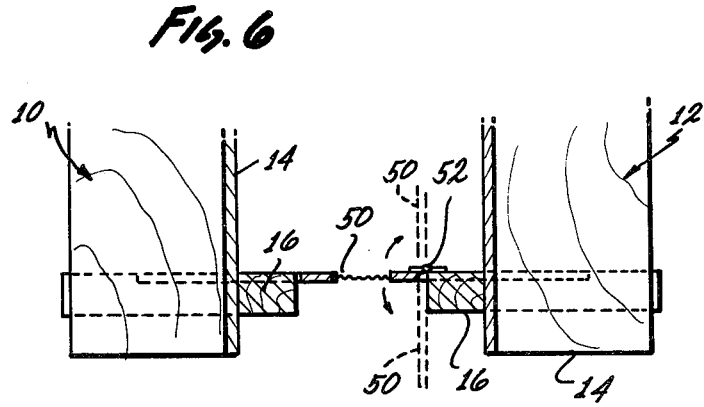
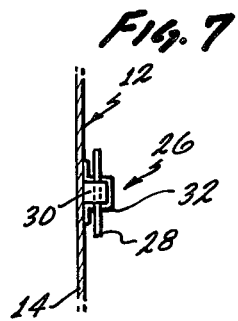

U.S. Patent  Apr. 1, 1980  Sheet 2 of 2  4,195,593
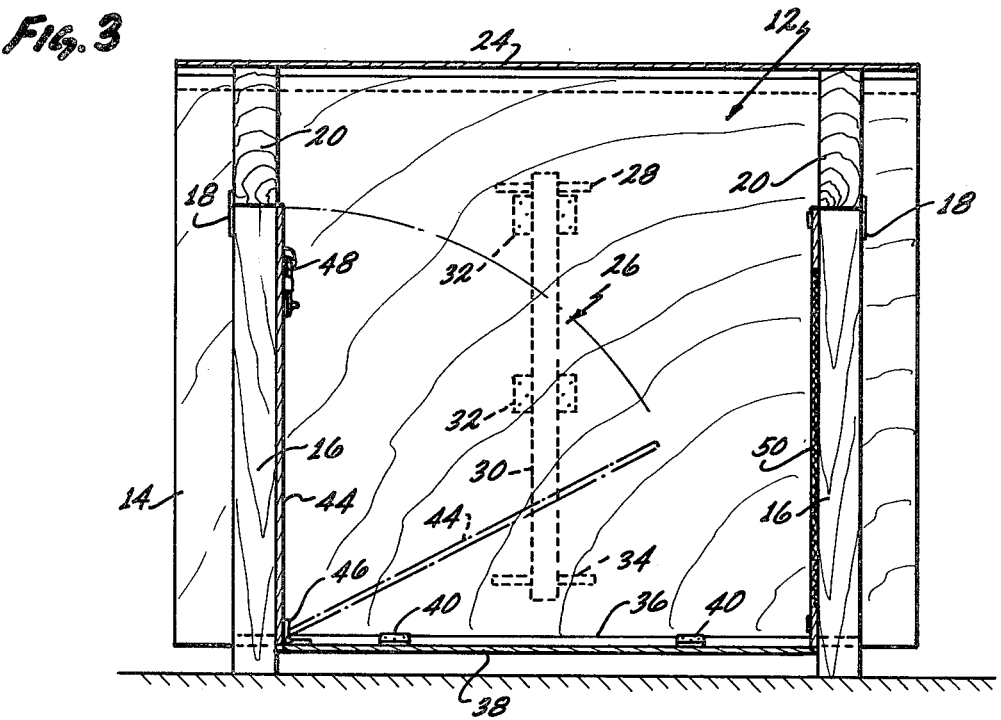
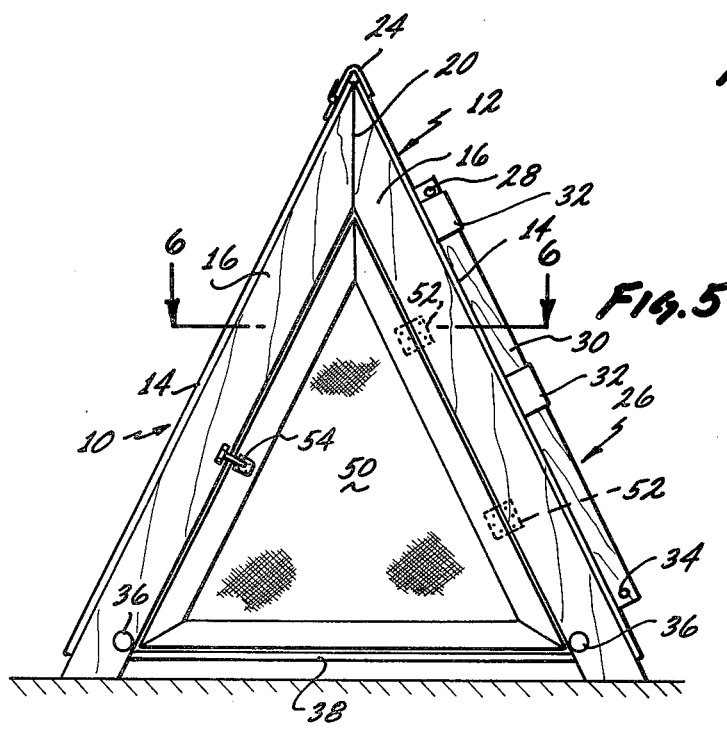
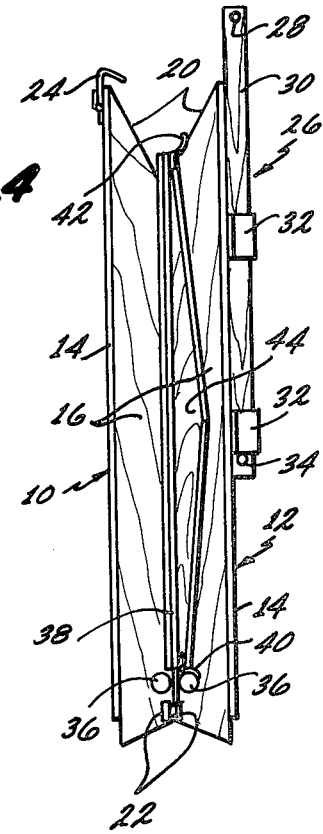

PORTABLE DOG HOUSE

BACKGROUND OF THE INVENTION

The present invention pertains to shelters for dogs and other pet animals, which, by nature of the construction of the shelter, is collapsible into a compact, easily transportable mode, and expands into a convenient shelter for the pet when the unit is in situe.

Pets of all types are on the increase in America today, and it is common that a small out building be designated for their use. However, with the increasingly mobile nature of society, both with reference to the frequency of semi-permanent moves and to vacationing activity, it has become desirable that a pet-house be developed which is adapted to frequent moving. Just as the mobile home and modular home have become increasingly commonplace for human inhabitants, there is a real need for a house for dogs and other pets, which is very conveniently portable and can be taken along on vacation, conveniently positioned outside of an apartment, and otherwise moveable in a problem-free manner from place to place as the masters move on.

SUMMARY OF THE INVENTION

The present invention fulfils the above calling for a dog-house or a pet-house, being collapsible into a conveniently carried portable mode, but which is also expandable into a very rigid and strong pet-house when set up.

The unit takes on a basic A-frame form having two roof panels hinged near the top and resting on the supporting surface with their lower extremities. A floor panel is hinged along the bottom edge of one of the roof panels, this floor panel being foldable up against the roof panel to which it is hinged so that it may be sandwiched between the two roof panels when in its portable mode. Front and rear doorway panels may also be included and hinged to other panels such as the roof and floor panels, respectively, so that they also may be folded into the area defined by the roof panels and sandwiched therebetween for portability. The roof panels are provided with magnets or other attachment means for holding themselves together during transport, and a convenient handle mounted on one of the roof panels slides upwardly into a convenient gripping mode.

BRIEF DESCRIPTION OF THE DRAWING

FIG. 1 is a perspective view of the pet-house showing certain hidden support structures;

FIG. 2 is a vertical section taken along line 2—2 of FIG. 1;

FIG. 3 is a vertical sectional view taken along line 3—3 of FIG. 2;

FIG. 4 is an end elevation view of the pet-house when collapsed for portage;

FIG. 5 is a front end elevation view of the pet-house when set up for habitation.

FIG. 6 is a horizontal sectional view of a portion of the front end of the pet-house taken along line 6—6 of FIG. 5;

FIG. 7 is a detail showing an end view of the carrying handle.

DETAILED DESCRIPTION OF THE PREFERRED EMBODIMENT

As shown best in FIGS. 1 and 2, the pet-house of the instant invention comprises a pair of roof panels 10 and 12 arranged in an A-frame construction to define a shelter. Each of these roof panels is composed of a pair of planar members 14 and support beam 16, the latter being hinged at 18 and having an angular cut at 20 as best seen in FIG. 2 so that the angular faces defined at the upper end of each of the beams abuts its mating beam as shown in FIG. 2 to provide the roof panels with support against further separation of the lower portion.

Thus the two basic modes of the pet-house are shown in FIGS. 2 and 4, the shelter mode of FIG. 2 in which the roof panels are fully expanded to define a covered area, and the portability mode in FIG. 4 wherein the beam 16 of the roof panels abut, and are held together by magnets 22 or the like embedded in the lower portions thereof. Other planar structure defined hereinafter is captured between the planar members 14 in sandwich fashion when the pet-hours is in its portability mode of FIG. 4.

Turning again to FIG. 2, in order to perfectly waterproof the roof portions of the pet-house, a pivotal roof cap 24, which extends along the length of the joint between the roof panels is provided. This cap is pivoted in place in FIGS. 1 and 2, and can be flipped back out of the way to permit separation of the upper ends of the beams 16.

Also, a carrying handle 26 has a T-bar 28 mounted on a shank 30, which is slideably seated in mounted brackets 32 so that the handle is conveniently out of the way when the unit is set up, but extends for convenient carrying as in FIG. 4 in the portability mode, in which case stop pegs 34 engage the lower of the 2 brackets 32.

Turning to the interior of the pet-house, a pair of dowels 36 span between the lower portions of the beams 16, and a floor panel 38 is hinged at 40 to one of these dowels, and is provided with hooks 42 at the opposite edge to support the floor against the dowel. The floor as shown will be suspended slightly above the ground to help in keeping it free of ground matter.

A rear end wall 44 is pivoted to the floor at 46, and is supported in its upright position by a slide bolt 48, and folds down as shown in FIG. 3 against the upper surface of the floor when not in use.

There is also a front screen door 50, which is rather loosely hinged to the back side of one of the beams 16 so that this door will open outwardly to permit access to a pet, but folds inwardly when the unit is collapsed. This hinge is shown in detail in FIG. 6. The screen door also engages one of the beams 16 with a slide bolt 52 when closed. The front end of the pet-house could be left open without any screen door, the only purpose of this member being to either confine the pet, or, in a unit somewhat more tightly constructed than that shown, to protect the pet from flying insects.

The fully collapsed unit in FIG. 4 is achieved by first folding the rear end wall 44 down against the floor as shown in FIG. 3, then folding the floor together with the rear end wall up to the right as shown in FIG. 4 so that it is tucked inside the right roof panel, and then folding the screen door inwardly on its beam-mounted hinges 52.

Once these panels are tucked up, the two roof panels are collapsed together as shown in FIG. 4, at which point the magnets 22 become operative in holding the entire unit together. The T-bar handle is then elevated and the unit is then ready for portage.

Note should also be made of an eye bolt 56, which simply serves as a tethering point for a dog leash.

Clearly some modification of the exact form of the invention as described herein and claimed below is conceivable without overreaching the scope of the claims. Hinged points could be somewhat rearranged, the folding order made slightly different, and other minor modifications are conceivable, and fall within the scope of the claimed invention.

I claim:

1. A portable pet-house comprising:
   (a) a T-bar handle;
   (b) a plurality of hingedly interconnected panels including two roof panels hinged together at their upper portions to define an upper joint, one of said roof panels having brackets slidably mounting said T-bar handle;
   (c) said panels being errectable to define a self-supporting shelter and collapsible into a portable mode wherein said panels are substantially parallel and including a plurality of complimenting magnetic latch elements mounted in said roof panels to maintain same together when said panels are collapsed such that said panels are depending generally vertically from said handle when the latter is carried; and
   (d) one of said roof panels having a V-shaped roof cap pivoted thereto and pivotable across the joint between said roof panels when same are defining a shelter to weatherproof the meeting of said roof panels and being pivotal free of said joint when said panels are prepared for transport.

* * * * *